US009694651B2

(12) United States Patent
Zeigler et al.

(10) Patent No.: US 9,694,651 B2
(45) Date of Patent: Jul. 4, 2017

(54) VEHICLE AIR CONDITIONING AND HEATING SYSTEM PROVIDING ENGINE ON AND OFF OPERATION

(75) Inventors: Terry Zeigler, Byron, IL (US); Eric Elias, Loves Park, IL (US); Christophe Barreau, Rockford, IL (US)

(73) Assignee: Bergstrom, Inc., Rockford, IL (US)

( * ) Notice: Subject to any disclaimer, the term of this patent is extended or adjusted under 35 U.S.C. 154(b) by 2976 days.

(21) Appl. No.: 11/677,643

(22) Filed: Feb. 22, 2007

(65) Prior Publication Data

US 2007/0131408 A1    Jun. 14, 2007

Related U.S. Application Data

(63) Continuation-in-part of application No. 11/088,441, filed on Mar. 24, 2005, now Pat. No. 7,591,143,
(Continued)

(51) Int. Cl.
*B60H 1/32*    (2006.01)
*B60H 1/00*    (2006.01)

(52) U.S. Cl.
CPC ....... *B60H 1/3222* (2013.01); *B60H 1/00378* (2013.01); *B60H 1/00428* (2013.01); *B60H 1/00778* (2013.01); *B60H 1/323* (2013.01)

(58) Field of Classification Search
CPC .............. B60H 1/3222; B60H 1/00428; B60H 1/00378; B60H 1/323; B60H 1/00778
(Continued)

(56) References Cited

U.S. PATENT DOCUMENTS 2,241,060 A * 5/1941 Gibson .......................... 165/236
2,456,386 A * 12/1948 Cooper .......................... 62/175
(Continued)

FOREIGN PATENT DOCUMENTS

DE      100 14 483 A1    11/2000
DE  10 2005 004 950 A1     8/2006
(Continued)

OTHER PUBLICATIONS

Glacier Bay Inc., Glacier Bay's Home Page, page printed from a website, http://web.archive.org/web/19990417062255/http://www.glacierbay.com/, apparent archive date: Apr. 17, 1999, 1 page.
(Continued)

*Primary Examiner* — Len Tran
*Assistant Examiner* — Alexis Cox
(74) *Attorney, Agent, or Firm* — Reinhart Boerner Van Deuren P.C.

(57) ABSTRACT

A heating, ventilating and air conditioning (HVAC) system for use in an over-the-road or off road vehicle is provided. The HVAC system may be operated regardless of the operational state of the engine. That is, the HVAC system may be operated to condition the interior compartments of an over-the-road vehicle while the engine is running and while the engine is in a no-idle (off) condition. In general, the HVAC system efficiently shares one or more typical air conditionings components with those already found in the vehicle. In one instance, the HVAC system operates an electrically-driven compressor when a belt-driven compressor is idle. In another case, the HVAC system operates both an electrically-driven compressor and a no-idle condenser when a belt-driven compressor and condenser are idle. In yet another embodiment, the HVAC system shares an evaporator.

4 Claims, 12 Drawing Sheets

Related U.S. Application Data which is a continuation of application No. 10/134,875, filed on Apr. 29, 2002, now Pat. No. 6,889,762.

(58) Field of Classification Search
USPC .................................. 165/240; 62/236, 244
See application file for complete search history.

(56) References Cited

U.S. PATENT DOCUMENTS

| | | | |
|---|---|---|---|
| 2,789,234 A | 4/1957 | Lambert et al. | |
| 3,590,910 A | 7/1971 | Lorenz | |
| 3,627,030 A | 12/1971 | Lorenz | |
| 3,807,087 A | 4/1974 | Staats | |
| 3,844,130 A | 10/1974 | Wahnish | |
| 3,866,433 A * | 2/1975 | Krug | 62/229 |
| 3,885,398 A | 5/1975 | Dawkins | |
| 3,984,224 A * | 10/1976 | Dawkins | 62/89 |
| 3,995,443 A | 12/1976 | Iversen | |
| 4,015,182 A | 3/1977 | Erdman | |
| 4,025,326 A * | 5/1977 | Leonard, Jr. | 62/175 |
| 4,105,064 A * | 8/1978 | Del Toro et al. | 165/233 |
| 4,217,764 A | 8/1980 | Armbruster | |
| 4,271,677 A | 6/1981 | Harr | |
| 4,280,330 A | 7/1981 | Harris et al. | |
| 4,324,286 A | 4/1982 | Brett | |
| 4,359,875 A | 11/1982 | Ohtani | |
| 4,412,425 A | 11/1983 | Fukami | |
| 4,448,157 A | 5/1984 | Eckstein et al. | |
| 4,459,519 A | 7/1984 | Erdman | |
| 4,577,679 A | 3/1986 | Hibshman | |
| 4,604,036 A | 8/1986 | Sutou et al. | |
| 4,617,472 A | 10/1986 | Slavik | |
| 4,658,593 A | 4/1987 | Stenvinkel | |
| 4,667,480 A | 5/1987 | Bessler | |
| 4,694,798 A | 9/1987 | Kato et al. | |
| 4,825,663 A | 5/1989 | Nijar et al. | |
| 4,841,733 A | 6/1989 | Dussault et al. | |
| 4,856,078 A | 8/1989 | Konopka | |
| 4,893,479 A | 1/1990 | Gillett et al. | |
| 4,945,977 A | 8/1990 | D'Agaro | |
| 4,947,657 A * | 8/1990 | Kalmbach | B60H 1/3204 62/236 |
| 5,025,634 A | 6/1991 | Dressler | |
| 5,046,327 A | 9/1991 | Walker et al. | |
| 5,067,652 A | 11/1991 | Enander | |
| 5,095,308 A | 3/1992 | Hewitt | |
| 5,125,236 A | 6/1992 | Clancey et al. | |
| 5,170,639 A | 12/1992 | Datta | |
| 5,205,130 A * | 4/1993 | Pannell | 62/236 |
| 5,275,012 A | 1/1994 | Dage et al. | |
| 5,316,074 A | 5/1994 | Isaji et al. | |
| 5,333,677 A * | 8/1994 | Molivadas | 165/272 |
| 5,333,678 A * | 8/1994 | Mellum et al. | 165/42 |
| 5,361,593 A | 11/1994 | Dauvergne | |
| 5,376,866 A | 12/1994 | Erdman | |
| 5,396,779 A | 3/1995 | Voss | |
| 5,402,844 A | 4/1995 | Elluin et al. | |
| 5,465,589 A | 11/1995 | Bender et al. | |
| 5,497,941 A | 3/1996 | Numazawa et al. | |
| 5,501,267 A | 3/1996 | Iritani et al. | |
| 5,502,365 A | 3/1996 | Nanbu et al. | |
| 5,524,442 A * | 6/1996 | Bergman et al. | 62/86 |
| 5,528,901 A | 6/1996 | Willis | |
| 5,562,538 A | 10/1996 | Suyama | |
| 5,586,613 A | 12/1996 | Ehsani | |
| 5,657,638 A | 8/1997 | Erdman et al. | |
| 5,682,757 A | 11/1997 | Peterson | |
| 5,782,610 A | 7/1998 | Ikeda | |
| 5,819,549 A | 10/1998 | Sherwood | |
| 5,860,285 A * | 1/1999 | Tulpule | 62/127 |
| 5,896,750 A | 4/1999 | Karl | |
| 5,898,995 A | 5/1999 | Ghodbane | |
| 5,899,081 A | 5/1999 | Evans et al. | |
| 5,901,572 A | 5/1999 | Peiffer et al. | |
| 5,901,780 A | 5/1999 | Zeigler et al. | |
| 5,921,092 A | 7/1999 | Behr et al. | |
| 5,934,089 A | 8/1999 | Nakagawa et al. | |
| 5,982,643 A | 11/1999 | Phlipot | |
| 6,016,662 A | 1/2000 | Tanaka et al. | |
| 6,028,406 A | 2/2000 | Birk | |
| 6,038,877 A | 3/2000 | Peiffer et al. | |
| 6,038,879 A | 3/2000 | Turcotte et al. | |
| 6,059,016 A | 5/2000 | Rafalovich et al. | |
| 6,073,456 A | 6/2000 | Kawai et al. | |
| 6,111,731 A | 8/2000 | Cepynsky et al. | |
| 6,112,535 A | 9/2000 | Hollenbeck | |
| 6,134,901 A | 10/2000 | Harvest et al. | |
| 6,152,217 A | 11/2000 | Ito et al. | |
| 6,205,795 B1 | 3/2001 | Backman et al. | |
| 6,205,802 B1 | 3/2001 | Drucker et al. | |
| 6,209,333 B1 | 4/2001 | Bascobert | |
| 6,212,898 B1 * | 4/2001 | Ueno et al. | 62/335 |
| 6,213,867 B1 | 4/2001 | Yazici et al. | |
| 6,230,507 B1 | 5/2001 | Ban et al. | |
| 6,253,563 B1 | 7/2001 | Ewert et al. | |
| 6,276,161 B1 | 8/2001 | Peiffer et al. | |
| 6,282,919 B1 | 9/2001 | Rockenfeller et al. | |
| 6,351,957 B2 | 3/2002 | Hara | |
| 6,405,793 B1 * | 6/2002 | Ghodbane et al. | 165/203 |
| 6,411,059 B2 | 6/2002 | Frugier et al. | |
| 6,453,678 B1 | 9/2002 | Sundhar | |
| 6,457,324 B2 | 10/2002 | Zeigler et al. | |
| 6,467,279 B1 | 10/2002 | Backman et al. | |
| 6,474,081 B1 | 11/2002 | Feuerecker | |
| 6,530,426 B1 | 3/2003 | Kishita et al. | |
| 6,626,003 B1 | 9/2003 | Kortüm et al. | |
| 6,653,215 B1 | 11/2003 | Brown et al. | |
| 6,684,863 B2 | 2/2004 | Dixon et al. | |
| 6,725,134 B2 | 4/2004 | Dillen et al. | |
| 6,745,585 B2 | 6/2004 | Kelm et al. | |
| 6,748,750 B2 | 6/2004 | Choi | |
| 6,758,049 B2 | 7/2004 | Adachi et al. | |
| 6,889,762 B2 | 5/2005 | Zeigler et al. | |
| 6,904,766 B2 * | 6/2005 | Ito et al. | 62/324.1 |
| 6,939,114 B2 | 9/2005 | Iwanami et al. | |
| 6,965,818 B2 | 11/2005 | Koenig et al. | |
| 6,981,544 B2 | 1/2006 | Iwanami et al. | |
| 7,150,159 B1 * | 12/2006 | Brummett | B60H 1/00378 62/236 |
| 7,290,400 B2 | 11/2007 | Heberle et al. | |
| 7,316,119 B2 | 1/2008 | Allen | |
| 7,331,383 B2 * | 2/2008 | Turner et al. | 165/202 |
| 7,350,368 B2 | 4/2008 | Heberle et al. | |
| 7,448,227 B2 | 11/2008 | Zeigler et al. | |
| 7,454,922 B2 | 11/2008 | Zeigler et al. | |
| 7,591,143 B2 | 9/2009 | Zeigler et al. | |
| 7,591,303 B2 | 9/2009 | Zeigler et al. | |
| 8,453,722 B2 * | 6/2013 | Zeigler | B60H 1/00378 123/41.19 |
| 2001/0010261 A1 | 8/2001 | Oomura et al. | |
| 2002/0026801 A1 | 3/2002 | Yamashita | |
| 2002/0078700 A1 | 6/2002 | Kelm et al. | |
| 2002/0084769 A1 | 7/2002 | Iritani et al. | |
| 2002/0108384 A1 | 8/2002 | Higashlyama | |
| 2002/0112489 A1 | 8/2002 | Egawa et al. | |
| 2002/0157412 A1 | 10/2002 | Iwanami et al. | |
| 2002/0157413 A1 | 10/2002 | Iwanami et al. | |
| 2003/0041603 A1 | 3/2003 | Tada et al. | |
| 2003/0105567 A1 | 6/2003 | Koenig et al. | |
| 2003/0106332 A1 | 6/2003 | Okamoto et al. | |
| 2003/0209021 A1* | 11/2003 | Zeigler | 62/239 |
| 2004/0168449 A1 | 9/2004 | Homan et al. | |
| 2005/0109499 A1 | 5/2005 | Iwanami et al. | |
| 2005/0161211 A1 | 7/2005 | Zeigler et al. | |
| 2005/0230096 A1 | 10/2005 | Yamaoka | |
| 2005/0257545 A1* | 11/2005 | Ziehr | B60H 1/004 62/236 |
| 2006/0042284 A1* | 3/2006 | Heberle et al. | 62/236 |
| 2006/0042285 A1* | 3/2006 | Heberle | B60H 1/322 62/236 |
| 2006/0042286 A1* | 3/2006 | Heberle | B60H 1/00207 62/239 |
| 2006/0102333 A1 | 5/2006 | Zeigler et al. | |
| 2006/0151163 A1 | 7/2006 | Zeigler et al. | |

(56) References Cited

U.S. PATENT DOCUMENTS

| | | | |
|---|---|---|---|
| 2006/0151164 | A1 | 7/2006 | Zeigler et al. |
| 2007/0028631 | A1* | 2/2007 | Fukuda et al. .................. 62/185 |
| 2007/0131408 | A1 | 6/2007 | Zeigler et al. |
| 2008/0110185 | A1 | 5/2008 | Veettil et al. |
| 2008/0156887 | A1 | 7/2008 | Stanimirovic |
| 2008/0196436 | A1 | 8/2008 | Connell et al. |
| 2008/0196877 | A1 | 8/2008 | Zeigler et al. |
| 2009/0206661 | A1* | 8/2009 | Baumann ........... B60H 1/00428 307/10.1 |
| 2009/0301702 | A1 | 12/2009 | Zeigler et al. |
| 2010/0257886 | A1* | 10/2010 | Suzuki et al. .................. 62/276 |
| 2011/0073285 | A1* | 3/2011 | Benoit et al. ............ 165/104.28 |
| 2011/0308265 | A1 | 12/2011 | Phannavong et al. |
| 2012/0247135 | A1 | 10/2012 | Fakieh |
| 2013/0167577 | A1 | 7/2013 | Street et al. |
| 2013/0319630 | A1 | 12/2013 | Yamamoto et al. |
| 2014/0066572 | A1 | 3/2014 | Corveleyn et al. |
| 2014/0075973 | A1 | 3/2014 | Graaf et al. |
| 2014/0290299 | A1 | 10/2014 | Nakaya |

FOREIGN PATENT DOCUMENTS

| | | |
|---|---|---|
| DE | 10 2010 254965 A1 | 6/2012 |
| EP | 1 024 038 A2 | 8/2000 |
| JP | S48-106548 | 12/1973 |
| JP | S56-092055 | 7/1981 |
| JP | 04-251160 | 9/1992 |
| JP | 5032121 A | 2/1993 |
| JP | 07-186711 A | 7/1995 |
| JP | 08-178438 | 7/1996 |
| JP | 10-103792 | 4/1998 |
| JP | 2000108651 A | 4/2000 |
| JP | 2000127753 A | 5/2000 |
| JP | 2001-322423 | 11/2001 |
| JP | 2002081823 A | 3/2002 |
| JP | 2002-321522 | 11/2002 |
| JP | 2003048425 A | 2/2003 |
| JP | 2003-104041 | 4/2003 |
| JP | 2003-237356 | 8/2003 |
| JP | 2003-341334 | 12/2003 |
| JP | 2004-203175 | 7/2004 |
| JP | 2005-44551 A | 2/2005 |
| JP | 2005-219704 | 8/2005 |
| JP | 2006-321269 | 11/2006 |
| JP | 2012-17029 A | 1/2012 |
| WO | WO 89/09143 A1 | 10/1989 |
| WO | WO 00/00361 A1 | 1/2000 |
| WO | WO 2006/082082 A1 | 8/2006 |
| WO | WO 99/61269 | 12/2009 |

OTHER PUBLICATIONS

Glacier Bay Inc., Darpa/Glacier Bay ECS, pages printed from a website, http://web.archive.org/web/19991104132941/www.glacierbay.com/darpatxt.htm, apparent archive date: Nov. 4, 1999, 2 pages.

Glacier Bay Inc., Glacier Bay ECS DARPA Project—Final Report, pages printed from a website, http://web.archive.org/web/19991103001512/www.glacierbay.com/Darphtm.htm, apparent archive date: Nov. 3, 1999, 9 pages.

Glacier Bay Inc., Glacier Bay ECS DARPA Project—Project Photos, pages printed from a website, http://web.archive.org/web/19991103012854/www.glacierbay.com/Darpphotos.htm, apparent archive date: Nov. 3, 1999, 2 pages.

Glacier Bay Inc., Glacier Bay ECS DARPA Project—Operational Video, page printed from a website, http://web.archive.org/web/19991022221040/www.glacierbay.com/Darpvid.htm, apparent archive date Oct. 22, 1999; 1 page.

Glacier Bay Inc., R & D, pages printed from a website, http://web.archive.org/web/20000121130306/www.glacierbay.com/R&D.htm, apparent archive date: Jan. 21, 2000, 2 pages.

Glacier Bay Inc., Company History, pages printed from a website, http://web.archive.org/web/20000301153828/www.glacierbay.com/History.htm, apparent archive date: Mar. 1, 2000; 2 pages.

Glacier Bay Inc., Contact, page printed from a website, http://web.archive.org/web/19990508104511/www.glacierbay.com/Contact.htm, apparent archive date: May 8, 1999; 1 page.

Michael Löhle, Günther Feuerecker and Ulrich Salzer; NON Idling HVAC-module for Long Distance Trucks; SAE Technical Paper Series 1999-01-1193; International Congress and Exposition, Detroit, Michigan; Mar. 1-4, 1999; 8 pages.

Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.

Masami Konaka and Hiroki Matsuo; SAE Technical Paper Series 2000-01-1271; SAE 2000 World Congress, Detroit, Michigan; Mar. 6-9, 2000; 6 pages.

Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory, 9700 South Cass Avenue, Argonee, Illinois 60439; Jun. 2000; 30 pages.

Patricia Gardie and Vincent Goetz; Thermal EnergyStorage System by Solid Absorption for Electric Automobile Heating and Air-Conditioning; Paper; 5 pages.

TropiCool No-idle Heating & Cooling, 110V/12V High-efficiency, Self-contained, Electrified Heating/AC System; ACC Climate Control Brochure, Elkhart, Indiana; 1 page.

TropiCool Power Plus, More comfort. More efficiency. More options.; ACC Climate Control Brochure, Elkhart, Indiana; 3 pages.

Packless Industries, the leader in refrigerant to water coaxial heat exchangers, flexible and sucti . . . ; website—http://www.packless.com/profile.html; date last visited Aug. 9, 2007; 1 page.

FlatPlate Heat Exchangers; GEA FlatPlate Inc.; website—http://www.flatplate.com/profile.htm; date last visited Aug. 9, 2007; 3 pages.

Alfa Laval website http://www.alfalaval.com/ecoreJava/WebObjects/ecoreJava.woa/wa/showNode?siteNodeId=1668 &cont . . . ; date last visited May 18, 2007; 1 page.

* cited by examiner

VEHICLE AIR CONDITIONING AND HEATING SYSTEM PROVIDING ENGINE ON AND OFF OPERATION

CROSS-REFERENCE TO RELATED PATENT APPLICATIONS

This patent application is a continuation-in-part of U.S. patent application Ser. No. 11/088,441, filed Mar. 24, 2005, which is a continuation of U.S. patent application Ser. No. 10/134,875, filed Apr. 29, 2002, now U.S. Pat. No. 6,889,762, the entire teachings and disclosure of which are hereby incorporated in their entireties by reference thereto.

FIELD OF THE INVENTION

The present invention relates generally to over-the-road and off-road vehicle air conditioning systems, and more particularly to vehicle mounted heating, ventilation, and air conditioning (HVAC) systems utilizing variable speed motor driven compressors and controls therefor.

BACKGROUND OF THE INVENTION

The global economic expansion has stressed the transportation industry's ability to keep up with the shipping demands for raw materials and finished products. Indeed, the demand for qualified tractor-trailer drivers has far outstripped the ability of the industry to recruit and train individuals to fill the demand of the marketplace. As a result, the demand of the transportation industry to utilize the existing personnel and vehicles has resulted in increased time spent on the road and in the vehicles in an attempt to meet the market demands.

In an effort to maintain the safety of the highways, federal regulations governing the amount of time that a driver may spend behind the wheel have been instituted. When such maximum times have been reached, the driver is required to take his vehicle off the road and rest. The number of trucks pulled over at toll plazas, weight stations, and rest stops illustrates the compliance with such regulations. However, these locations often do not provide anywhere for the drivers to rest, necessitating continued occupancy within the vehicle.

In response to the needs of the transportation industry and in recognition of the locations where drivers are forced to rest, over-the-road vehicle manufacturers have continued to increase the emphasis on ergonomic factors in the design and manufacturer of their vehicles. Indeed, the interior of a modem over-the-road vehicle contains many features to minimize the stress and fatigue placed on the drivers during the operation of the vehicle. These features include vibration dampers and lumbar supports in the seats, increased sound insulation, and heating, ventilation, and air conditioning (HVAC) systems that provide a comfortable environment for the driver. To accommodate the required rest periods, and in recognition of the increased usage of driving teams, which typically include two individuals, one who drives while the other sleeps, many over-the-road vehicles include a sleeping compartment. This sleeping compartment is also temperature controlled so that time spent therein provides the occupant with a restful experience.

Unfortunately, the current state-of-the-art heating and air conditioning systems utilize engine-belt driven compressors for the air conditioning system to circulate and pump the refrigerant throughout the vehicle to cool the passenger compartments. An engine-belt driven pump is also utilized to circulate the engine waste heat throughout the passenger compartments when heating is required. While such systems are ideally suited to provide a temperature controlled environment during operation of the vehicle, neither of such systems is able to operate when the engine is turned off.

As a result of the inability of the current state of the art of vehicle HVAC systems to operate while the vehicle's engine is turned off, the over-the-road vehicle operators are forced to choose between two less than ideal situations while trying to rest. First, they may choose to continuously run their vehicle's engine so that they may have heating or air conditioning while they rest. Alternatively, they may choose to turn off their engine and try to rest in a non-temperature controlled environment, although temperatures can often reach extremes of high and low depending on where the vehicle happens to be when a required rest period is reached. While the first option improves safety by providing a comfortable resting environment for the driver, it greatly increases the cost of operating the over-the-road vehicle as the engine is continued to run, which burns additional fuel, simply to operate the heating or air conditioning system. Similarly, while the second option does not increase the cost of operating the vehicle because the engine is turned off, the driver may not fully be able to rest in an environment of temperature extremes, thus potentially reducing the safety of the operation of the vehicle.

There exists, therefore, a need in the art for a vehicle heating, ventilation, and air conditioning (HVAC) system that is able to provide conditioning of the interior of the vehicle, not only during periods of engine operation, but also during engine off or no-idle conditions.

BRIEF SUMMARY OF THE INVENTION

In view of the above, the present invention provides a new and improved heating, ventilating, and air conditioning (HVAC) system for an over-the-road vehicle that may be operated regardless of the operational state of the engine. That is, the instant invention provides a new and improved HVAC system that may be operated to condition the interior compartments of an over-the-road vehicle while the engine is running and while the engine is in a no-idle (off) condition. In general, the HVAC system efficiently shares one or more typical air conditionings components with those already found in the vehicle. In one instance, the HVAC system operates an electrically-driven compressor when a belt-driven compressor is idle. In another embodiment, the HVAC system operates both an electrically-driven compressor and a no-idle condenser when a belt-driven compressor and condenser are idle. In yet another embodiment, the HVAC system shares an evaporator.

In one aspect, the invention provides air conditioning system for use in a vehicle having an engine includes a primary air conditioning loop and an electrically-driven compressor. The primary air conditioning loop has a belt-driven compressor operable when the engine of the vehicle is operating. The electrically-driven compressor is thermally coupled to the primary air conditioning loop and is operable when the engine of the vehicle is not operating.

In another aspect, the invention provides an air conditioning system for use in a vehicle having an engine includes a primary air conditioning loop and a secondary air conditioning loop. The a primary air conditioning loop is operable when an engine of the vehicle is operating and includes an evaporator. The secondary air conditioning loop is operable when the engine of the vehicle is not operating and shares the evaporator with the primary air conditioning loop.

In yet another aspect, the invention provides a method of cooling a vehicle having a primary air conditioning loop operable when an engine of the vehicle is operating and a secondary air conditioning loop operable when an engine of the vehicle is not operating. The method includes the step of sharing at least one air conditioning component between the primary and secondary air conditioning systems.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
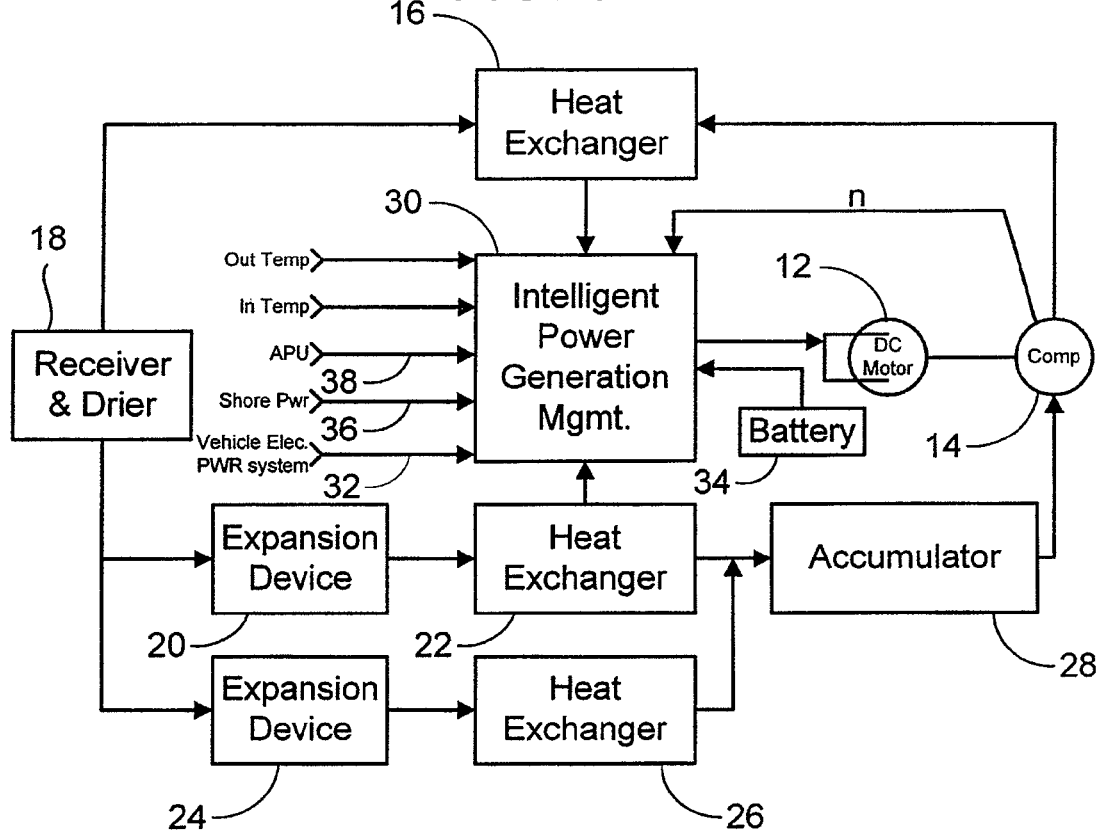
FIG. 1 is a simplified single line block diagram illustrating coolant flow and system component interconnections in an air conditioning system constructed in accordance with the teachings of the present invention.

FIG. 1 illustrates, in simplified block diagrammatic form, an embodiment of an air conditioning system of particular applicability to an over-the-road or off-road commercial vehicle. Unlike conventional vehicle air conditioning systems, the system 10 of the present invention utilizes a brushless DC motor 12 to drive a variable speed compressor 14. This variable speed, brushless DC motor-driven compressor 14 circulates refrigerant through a refrigerant-to-liquid or refrigerant-to-air heat exchanger 16 to an optional refrigerant receiver and dryer 18. The refrigerant then passes through an expansion device 20 and a refrigerant-to-air heat exchanger 22 to cool the passenger compartment.

In one embodiment of the present invention, a secondary parallel coolant loop is provided through expansion device 24 and refrigerant-to-air heat exchanger 26. Such secondary, parallel coolant loops are often used to directly cool the sleeping compartment of an over-the-road vehicle's cab. As such, the heat exchanger 26 is typically smaller than the heat exchanger 22 as the volume for which it is responsible is reduced compared to the primary driver/passenger compartment of the cab. While not illustrated in FIG. 1, the two refrigerant coolant loops may be selectively coupled via a valve. The inclusion of such a valve allows, for example, only the sleeping compartment to be air conditioned when no occupant is in the main passenger compartment of the cab and vise versa to increase the efficiency of the system. The refrigerant then passes through an operational refrigerant accumulator 28 before being returned to the compressor 14.

By utilizing a variable speed compressor 14 driven by brushless DC motor 12, the vehicle's air conditioning system may be operated during both engine on and engine off (no idle) conditions. The provision of the variable speed compressor 14 also allows the system to operate at a lower capacity during engine off operation to conserve the amount of stored energy available for usage by the system from the vehicle's batteries 34. The control for this operation is provided by an intelligent power generation management controller 30 that monitors various system parameters and the availability of power sources on the vehicle.

In this way, the vehicle's air conditioning system is now capable of being powered by either the vehicle's main electric power generation system 32, which is available while the vehicle's engine is operating, or by the electrical system while the engine is off by utilizing the stored electric power in the battery storage system 34. Additionally, the intelligent power generation management controller 30 also has the capability utilizing shore power 36 or power from an auxiliary electric power unit 38, such as a genset or fuel cell.

In the system 10 of the present invention, the use of the electric driven compressor 14 provides the ability to modulate its output from full capacity to low capacity. This allows the use of a single air conditioning system that can be used for both high load on-road operations with the engine operating, and at a lower capacity with the engine off to continue to cool the passenger compartments. Coordination of this modulation is provided by the intelligent power generation controller 30, which reduces the speed of the compressor when lower capacity power sources are only available. This modulation extends the duration of available operation from such power sources. That is, with a reduced speed of the compressor, the electric power demand is reduced as well.

Figure 2:
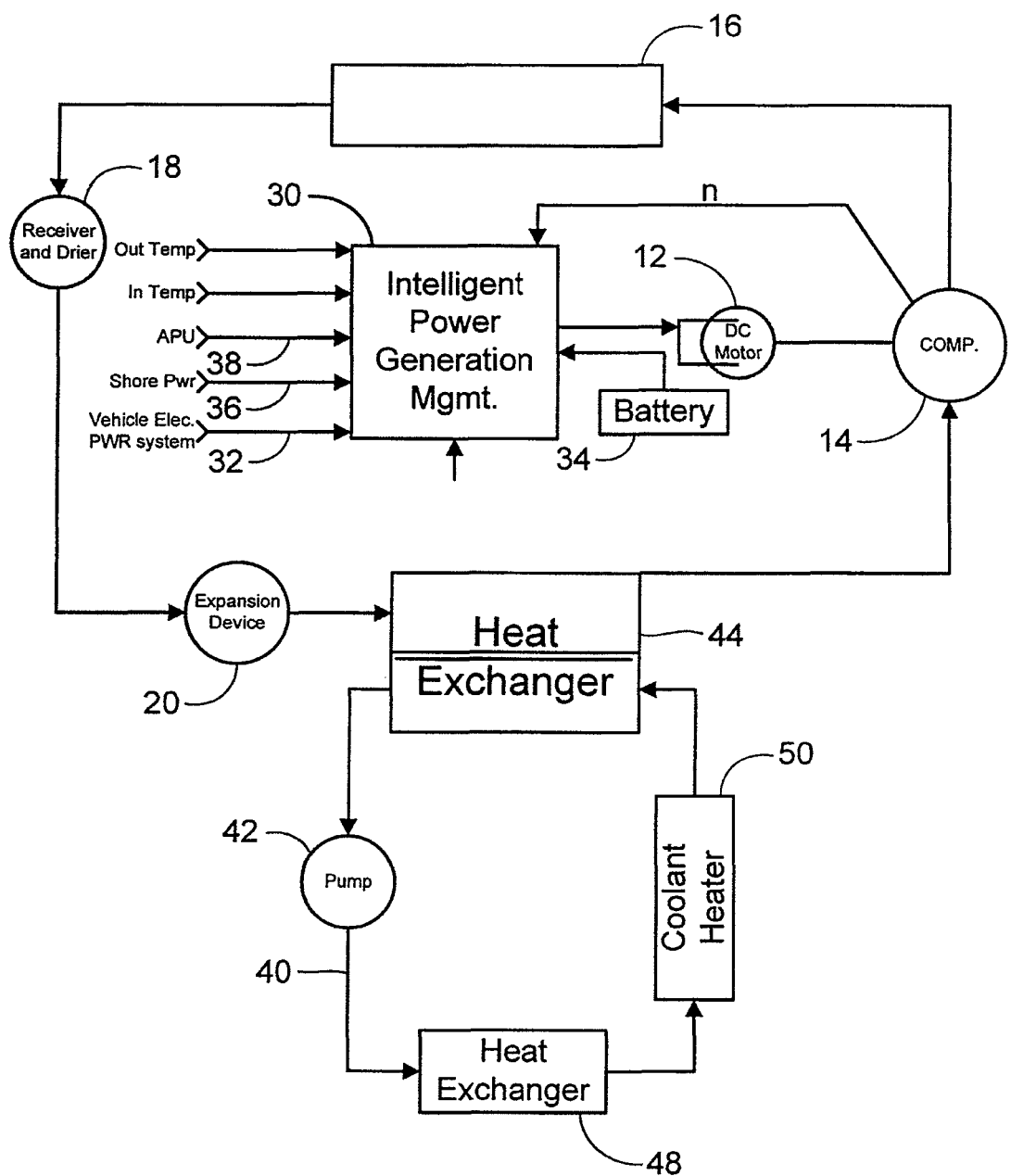
FIG. 2 illustrates an alternate embodiment of the invention forming a HVAC system capable of providing both heating and cooling of a passenger compartment of an over-the-road vehicle.

As illustrated in FIG. 2, an alternate embodiment of the system of the present invention includes a high pressure coolant loop 46 and a low pressure coolant loop 40 in a full HVAC system. The high pressure coolant loop 46 is driven by the compressor 14, and may be constructed as a modular, sealed refrigeration power cell having fixed tubing with permanent connections. The low pressure coolant loop 40 utilizes a low pressure coolant pump 42 to circulate the low pressure coolant through a refrigerant-to-liquid heat exchanger 44 that serves as the heat exchange medium between the high pressure coolant loop 46 and this secondary loop 40. Such a configuration is described in U.S. Pat. No. 6,276,161, entitled Modular Low Pressure Delivery Vehicle Air Conditioning System, assigned to the assignee of the instant application, the disclosure and teachings of which are hereby incorporated in their entireties by reference thereto. In such a configuration, the primary high pressure coolant loop 46 may be manufactured as a single integrated module having fixed tubing and permanent connections between the components thereof. As described in the above-identified patent, such a configuration minimizes the possibility of refrigerant leaks through high pressure couplings.

As illustrated in FIG. 2, the secondary low pressure coolant loop 40 uses a treated liquid-to-air heat exchanger 48 located within the vehicle's interior to provide cooling to the passenger compartments. To provide heating of the vehicle passenger compartments a coolant heater 50 may be utilized in the secondary low pressure coolant loop 40. During such heating operation, the intelligent power generation management controller 30 need only operate the secondary loop coolant pump 42 and the coolant heater 50 to provide this functionality. That is, no power need be delivered to the variable speed motor driven compressor 14 in this mode of operation, thereby further reducing the power consumption during engine off operation and extending the period of time that such operation is available.

Figure 3:
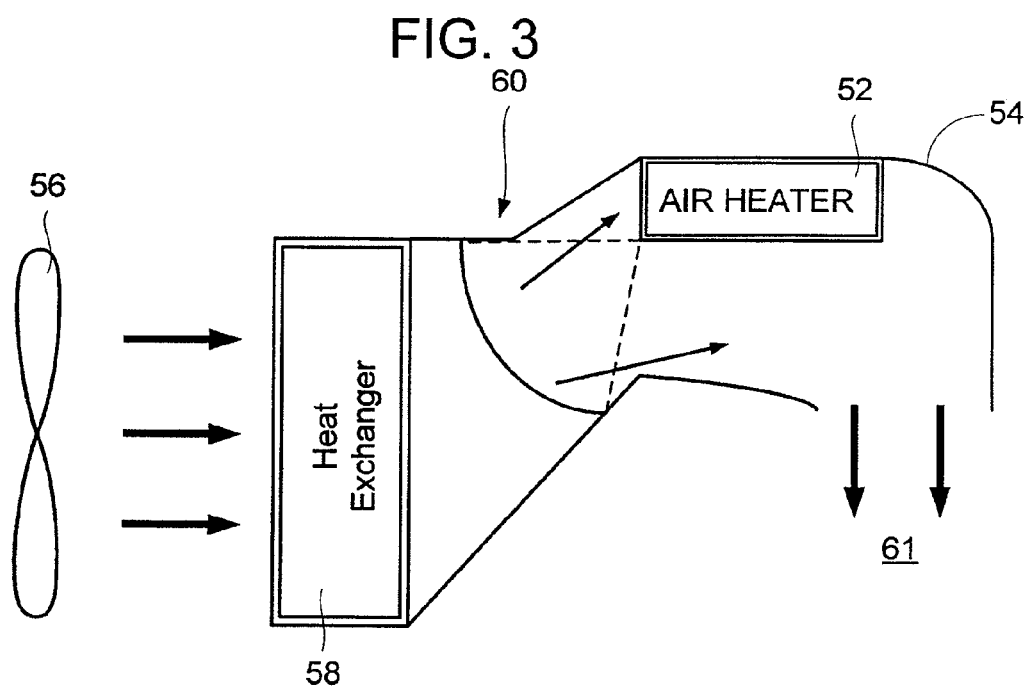
FIG. 3 is a simplified air flow diagram illustrating an alternate embodiment of an HVAC system constructed in accordance with the teachings of the present invention incorporating an air heater.

In an alternate embodiment illustrated in FIG. 3, an air heater 52 may be provided in the air outlet duct 54 of the vehicle HVAC system. This may be a fuel fired heater (FFH) or a resistance-type heater. In this configuration, the intelligent power generation management controller 30 need not operate either the high pressure coolant loop or the low pressure coolant loop, but instead only operate a circulation fan 56 and the air heater 52 to provide the necessary heating for the vehicle passenger compartments. This configuration provides additional power consumption savings and allows for a longer duration operation of the system in the heating mode. In the cooling mode of operation, the compressor will be operated to circulate refrigerant through the high pressure refrigerant to air or low pressure liquid to air heat exchanger 58. A mode door and/or temperature control door 60 controls the flow of air through the duct 54 to regulate the temperature of the air flowing into the vehicle passenger compartments as is known in the art.

Figure 4:
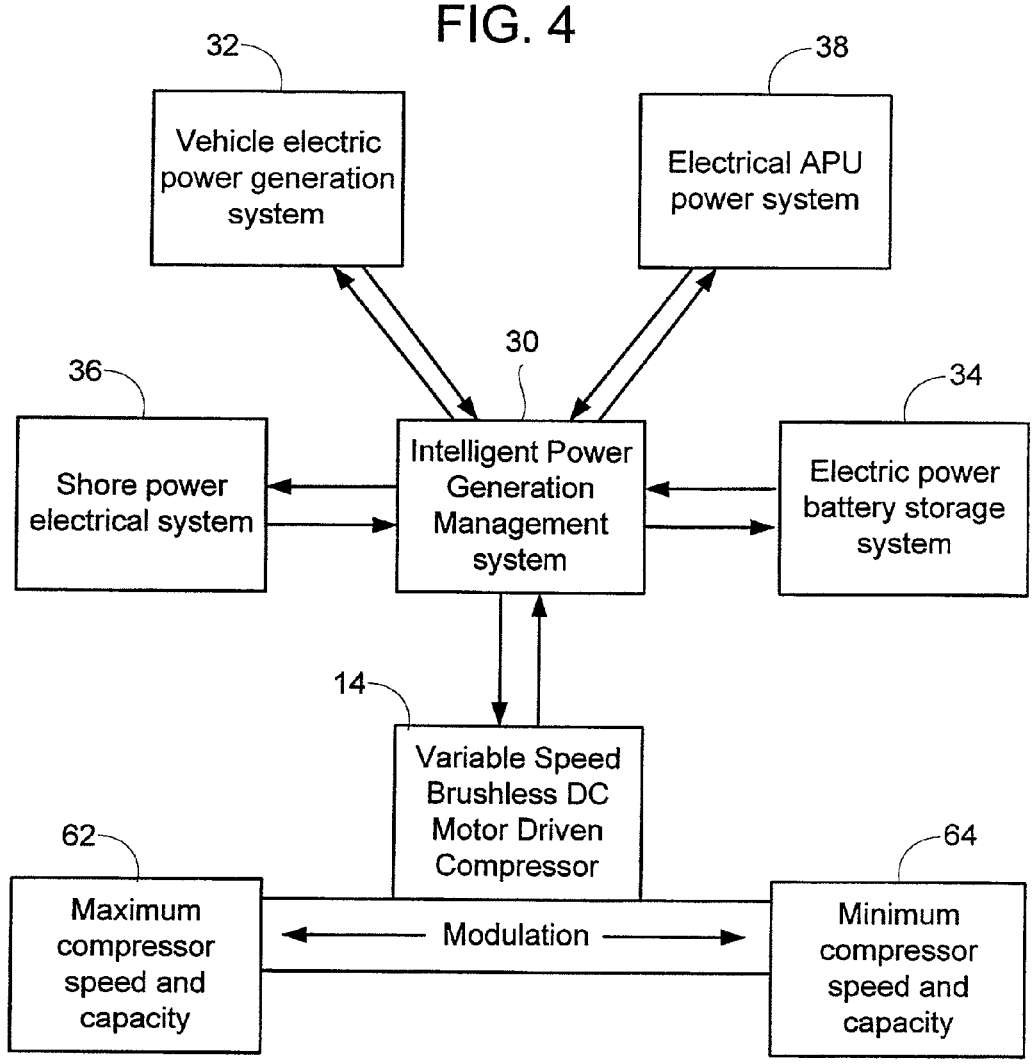
FIG. 4 is a simplified block diagram illustrating alternate power source utilization and compressor capacity modulation provided by the intelligent power generation management controller of an embodiment of the present invention.

As discussed briefly above and as illustrated in FIG. 4, the system of the present invention utilizes an intelligent power generation management controller 30 to modulate the speed, and therefore the capacity, of the variable speed brushless DC motor driven compressor 14. This output control can modulate the compressor 14 between a maximum compressor speed and capacity 62 during, for example, engine on operation or operation with an unlimited input power source such as the vehicle electrical power generation system 32 or a shore power electrical system 36, and a minimum compressor speed and capacity 64 during, for example, periods of operation utilizing limited sources of electrical power such as the electric power battery storage system 34 or an electrical auxiliary power unit power system 38. Operation at any speed and capacity between these two points 62, 64 is available as controlled by the intelligent power generation management controller 30. This controller 30 may also vary the modulation of compressor 14 when additional or different sources of power become available and as system parameters change to maintain optimal system performance.

For example, the controller 30 may operate the compressor 14 at maximum compressor speed and capacity while the vehicle is being driven to maintain the temperature of the passenger compartment of the vehicle at a user selected temperature. As the vehicle is parked and the engine is turned off, the controller 30 will sense the loss of the vehicle electric power generation system 32 and will begin to utilize electric power from the electric power battery storage system 34 to drive the compressor. The controller 30 will then reduce the compressor speed and capacity so as to not draw an excessive amount of power from the battery. The speed and capacity of the compressor may be increased as needs demand as determined by the controller 30. However, the controller 30 will not allow an amount of power to be discharged from the battery storage system 34 that would result in an insufficient amount of power remaining available to start the vehicle, or not allow an amount of power to be discharged from the battery storage system that will reduce the life of the system. As such a point is neared, the controller 30 will disable the power output to the compressor 14 thereby shutting down the HVAC system until and unless an additional source of power becomes available or the batteries are recharged. In one embodiment, this point is set at approximately 11.5 volts DC under load, although other set points may be appropriate based on the starting needs of the engine and battery life.

While the system is operating from the battery storage system 34, if the vehicle is connected to a shore power electrical system 36 the controller 30 will sense the availability of this new power source. The controller 30 will then begin utilizing this source to the exclusion of the battery system 34, and will increase the compressor speed and capacity as needed to maintain the temperature of the interior. If, instead, an auxiliary power unit on the vehicle is started, intelligent power generation management controller 30 will switch to this source of power to drive the compressor 14 to the exclusion of the battery storage system 34, and will increase the modulation of the compressor 14 as needed. However, unlike when the system is operated from the vehicle electric power generation system 32 or from the shore power electric system 36, the controller 30 may well reduce the modulation of the compressor 14 based upon the power draw and capacity of the APU power system 38. That is, the controller 30 recognizes that the APU power system 38 and the battery storage system 34 are limited resources that may be needed for other functions on the vehicle. As such, the controller 34 will ensure the conservation of some portion of these resources by disabling the HVAC system prior to exhaustion of these power sources.

Figure 5:
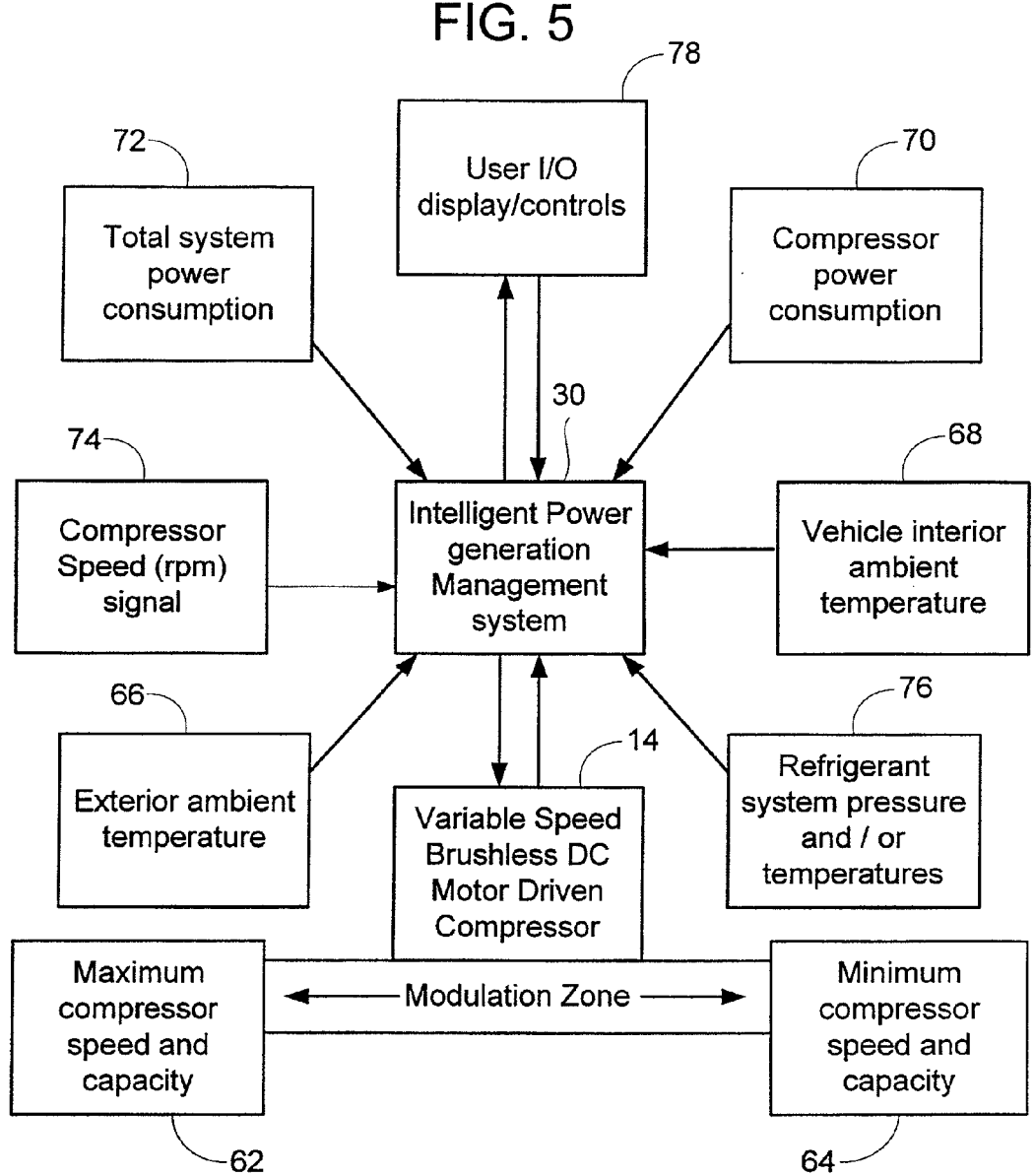
FIG. 5 is a simplified block diagram illustrating control parameter utilization and compressor capacity modulation provided by the intelligent power generation management controller of an embodiment of the present invention.

As illustrated in FIG. 5, the intelligent power generation management controller 30 monitor various system parameters to perform its modulation control function. Both the exterior ambient temperature 66 and the vehicle's interior ambient temperature 68 are monitored by the controller 30 to determine a compressor capacity to achieve and maintain the interior set point temperature. Typically, the larger the difference between the exterior and interior temperatures, the higher the capacity needed to maintain the differential. As the exterior ambient temperature 66 drops or the vehicle interior ambient temperature set point 68 rises the controller 30 may reduce the compressor speed and capacity and still maintain the user selected interior temperature.

The controller 30 also monitors the compressor power consumption 70 and the total system power consumption 72 in its modulation of the compressor speed and capacity. This information is used by the controller 30 to modulate the compressor 14 to ensure that the available power sources are not depleted beyond a predetermined power capacity for those times that a limited power source is being utilized. The controller 30 can reduce the compressor speed and capacity if the monitored power consumption exceeds appropriate levels. These parameters are also utilized to provide system protection from over load faults.

The controller 30 also monitors system parameters of the refrigeration system including the compressor speed 74 and the refrigerant system pressures and temperatures 76. The compressor speed signal 74 is utilized in the closed loop proportional, integral, derivative (PID) control of the compressor modulation. The refrigerant system pressures and/or temperatures are utilized as control parameters to regulate the compressor speed and capacity so that the power utilization is optimized. That is, the compressor modulation may be reduced once a temperature has been reached within the system to adequately cool the interior passenger compartments. Indeed, the compressor may be stopped altogether while the heat exchanger that cools the passenger compartments is at a temperature sufficient to provide adequate cooling. Once the temperature of this heat exchanger rises above a level sufficient to provide adequate cooling, the controller 30 may once again start the compressor 14 to reduce this temperature. In this way, the draw from the available power sources is minimized while still achieving the goal of providing adequate passenger cooling with the limited power sources available to drive the system. The system parameters also provide the controller 30 with the ability to detect faults within the system that reduce its ability to cool the interior compartment and that increase its power consumption.

System status display and control inputs may be provided between the controller 30 and the operator via a user input/output display 78 within the passenger compartment. When such a display 78 is utilized, communication of control parameters from the user may be provided to the controller 30 by means of a serial data link. Likewise, the display of system control and status information may be provided by the controller 30 to the display 78 by this serial data link. Control parameters from the user will typically include the desired operating mode of the HVAC system including off, heat, and cool modes of operation. Likewise a temperature setting may also be input through this I/O device 78.

In one embodiment of the present invention, the user may also select which of the available power sources should be utilized to drive the variable speed compressor. The controller 30 may also provide switching between available power sources as a source is depleted, or may query the user for authorization before providing such automatic source power transfer. Fan speed and interior compartment selection may also be controlled via the user I/O display or controls 78. System status information may also be displayed on the user I/O display 78 including interior and exterior temperatures, fan speed, mode selection, remaining available power, selected power source, available power sources, status and warning messages, etc.

In one embodiment of the present invention, the system allows adjustment of the following parameters via the display/control 78 compressor minimum control output; compressor maximum control output; maximum current draw; indoor unit minimum speed output; battery cutout voltage; compressor cooling control parameters kp, ki, and kd; and indoor fan heating control parameters Kp, Ki, and Kd. These parameters provide the proportional, integral, and derivative, or rate gains for the control PID equations. In this embodiment, the following parameters are reported to the display 78: operating mode; set temperature; cab temperature; discharge air temperature; battery voltage; battery current; and compressor commanded speed.

During operation, the intelligent power generation and management controller 30 processes the user inputs to determine the operational mode of the HVAC system. When the heating mode of operation is commanded by a user in the engine off (no idle) condition, the controller 30 commands a heater, e.g. coolant heater 50 illustrated in FIG. 2 or air heater 52 illustrated in FIG. 3, to turn on. These heaters may be fuel fired heaters or electric resistance heaters as appropriate. The controller 30 also controls the interior fan speed via a pulse width modulated (PWM) PID control loop in order to maintain the interior cab temperature at the set point. If, however, the user selects a cooling mode of operation, the condenser fan and pump outputs are turned on and the interior compartment fan is set to 100%. Initially, the compressor speed is set to the minimum capacity and speed setting. The controller 30 then modulates the speed and capacity of the compressor 14 to maintain the cab temperature at the user define set point via the PID control, except when certain conditions are encountered. These conditions include a high current/high load limit that reduces the compressor speed if the supply current exceeds a predefined current limit. In one embodiment, this current limit is set at 40 amps.

Similarly, if the requested compressor speed is at a minimum and the discharge air temperature is below the temperature set point, the compressor speed is set to zero, until the discharge air temperature is above the set point for more than a predetermined amount of time. Further, if the pressure sensing indicates a fault within the refrigeration the requested compressor speed will also be set to zero. The compressor will be disabled for a predetermined period of time before the compressor is allowed to be operated. Finally, if the battery voltage drops below a predetermined value load the controller 30 will disable all outputs until power has been cycled to the controller 30 or an alternate source of power becomes available.

While the system of the present invention provides significant advantages when integrated into a vehicle's HVAC system, many currently existing vehicles that already have a HVAC system installed would also benefit from such a system. However, the cost of removing a vehicle's current HVAC system and reinstalling the system of the present invention may well be cost prohibitive. Therefore, in an alternate embodiment of the present invention the components of the system are modularized for installation on a vehicle in addition to the currently existing HVAC system that is operable only during engine on operation. With this embodiment, the passenger compartment temperature may be controlled without running the engine.

Figure 6:
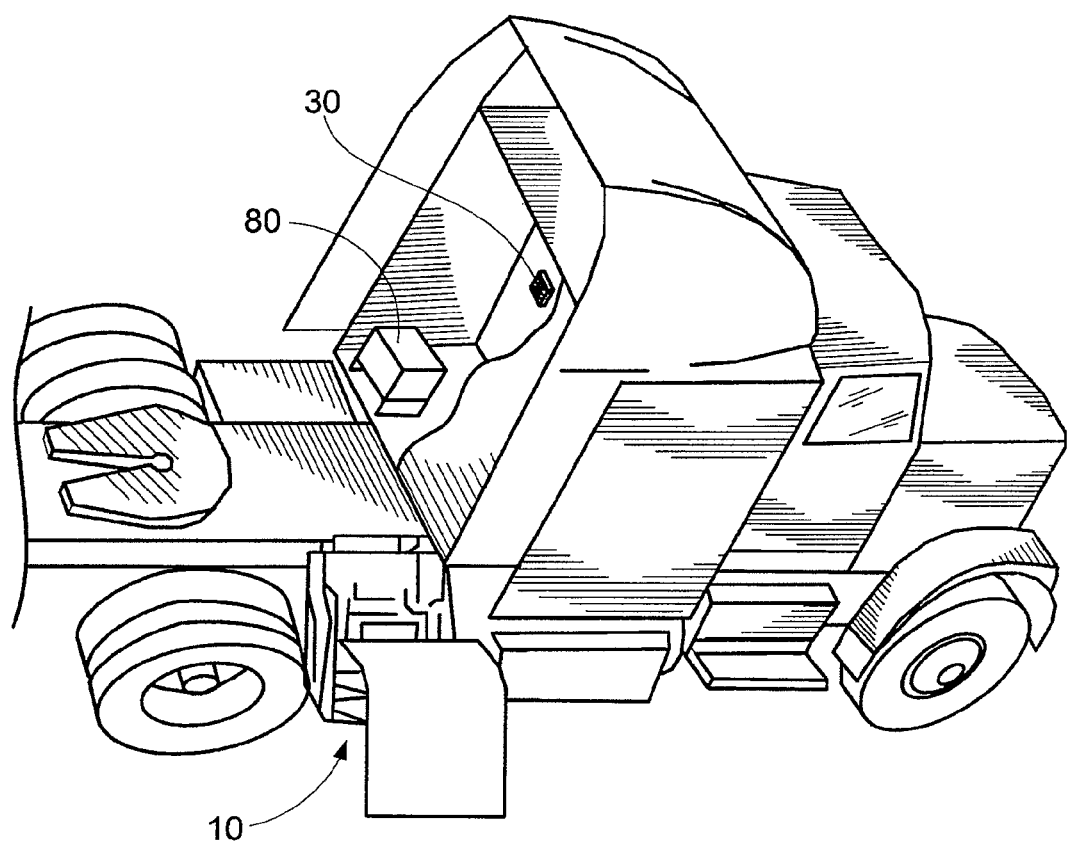
FIG. 6 is a simplified schematic diagram illustrating component placement in an over-the-road vehicle in accordance with one embodiment of the present invention.

Such a system installation is illustrated in exemplary locations in FIG. 6. As may be seen from this FIG. 6, the system 10 is provided a sealed refrigeration system with the variable speed brushless DC compressor and integrated coolant heater. This sealed unit may be installed in various locations within the interior or exterior of the vehicle. In FIG. 6, the installation of the sealed module is illustrated as being external to the engine and passenger compartments. Within the passenger compartment an inside HVAC unit 80 including a heat exchanger and fan is installed to provide the air conditioning of the passenger compartment. This interior unit 80 may also include an air heater if a coolant heater is not included with sealed system 10. In this embodiment the intelligent power generation management controller 30 is also installed within the passenger compartment. Through this controller 30 the users may control the system of the present invention and receive read out information.

Figure 7:
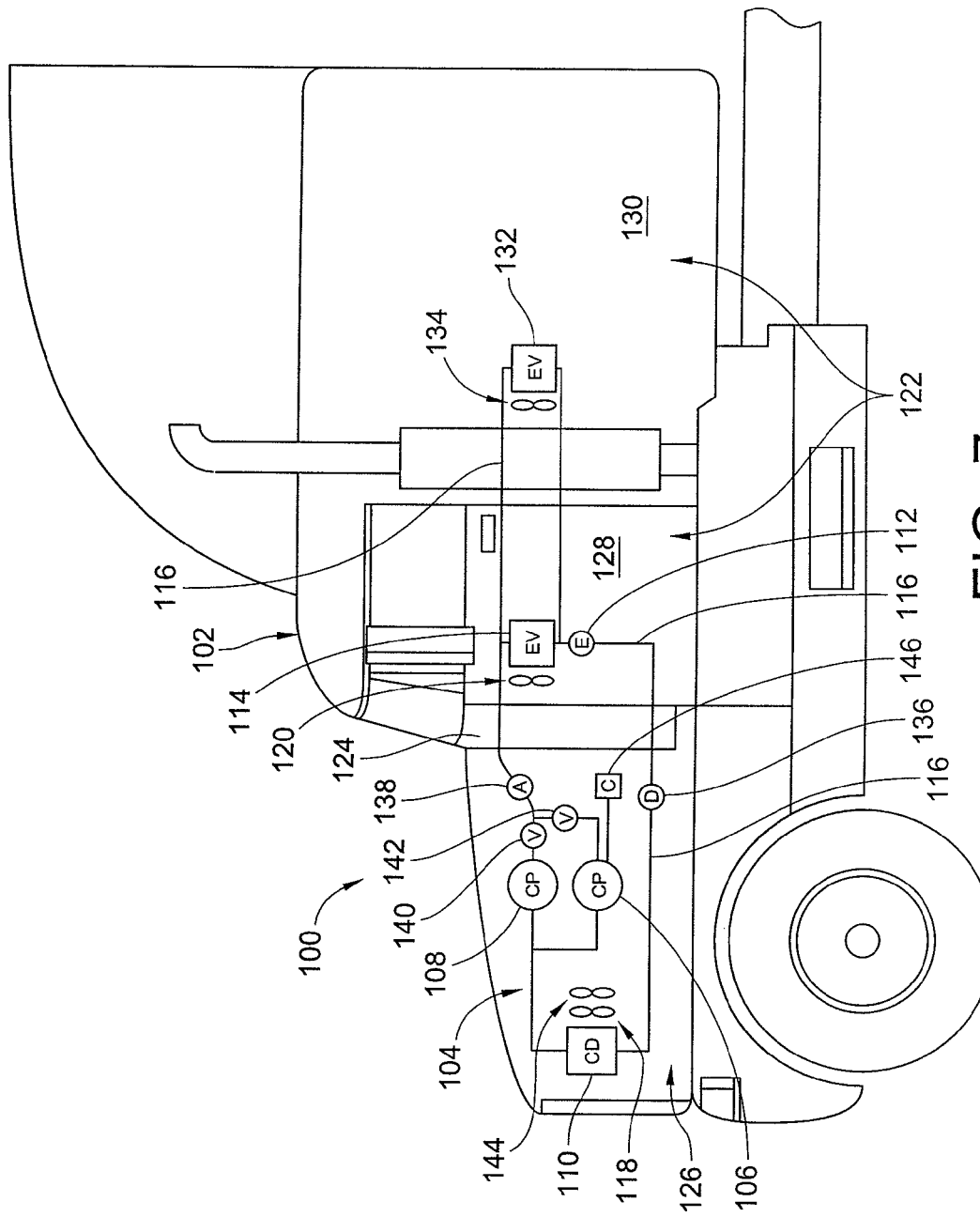
FIG. 7 is a simplified schematic diagram illustrating an electrically-driven compressor thermally coupled to a primary coolant loop in an over-the-road vehicle.

Referring to FIG. 7, in one embodiment an air conditioning system 100 is illustrated. The air conditioning system 100 is generally for use in a vehicle 102 (e.g., an over-the-road vehicle) having an engine (not shown). As will be more fully explained below, the air conditioning system 100 utilizes some components when the engine of the vehicle 102 is operating and other components when the engine of the vehicle is not operating. In at least one situation, one or more components within the air conditioning system 100 are shared between "engine on" and "engine off" systems.

As depicted in FIG. 7, the air conditioning system 100 generally comprises a primary air conditioning loop 104 and an electrically-driven compressor 106. The primary air conditioning loop 104 is usually installed by the manufacturer of the vehicle 102. The primary air conditioning loop 104 includes typical air conditioning components such as, for example, a belt-driven compressor 108, a condenser 110, an expansion valve 112, and an evaporator 114. These components are thermally coupled together by high-pressure refrigerant lines 116. Therefore, refrigerant is permitted to circulate through the primary air conditioning loop 104 in various states and at various temperatures and pressures.

The primary air conditioning loop 104 also includes a belt-driven air mover 118 (e.g., a fan) positioned proximate the condenser 110. The belt-driven air mover 118 moves air over the condenser 110 to extract and remove heat from the refrigerant. The primary air conditioning loop 104 also includes an electric air mover 120 positioned proximate the evaporator 114. The electric air mover 120 moves air over the evaporator 114 such that heat is absorbed from the interior 120 of the vehicle 122.

As shown in FIG. 7, the belt-driven compressor 108 and the condenser 110 are disposed on one side of a firewall 124 and within an engine compartment 126 of the vehicle 102. In contrast, the expansion valve 112 and the evaporator 114 are disposed on the other side of the firewall 124 and in thermal communication with the interior 120 of the vehicle 102. Where the high-pressure lines 116 passes through the firewall 124, high-pressure fittings (not shown) are installed by the manufacture of the vehicle 102.

In one embodiment, the interior 122 of the vehicle 102 is divided into a cab compartment 128 and a sleeper compartment 130. In these embodiments, an additional sleeper evaporator 132 is often included in the primary air conditioning loop 104. As shown in FIG. 7, the sleeper evaporator 132 is thermally coupled to the evaporator 114 by the high-pressure lines 116. An additional electric air mover 134 is positioned proximate the sleeper evaporator 132 to move air over the sleeper evaporator such that heat is absorbed from the sleeper compartment 130.

The evaporator 114 is placed in thermal communication with the cab compartment 128 to cool that area while the sleeper evaporator 132 is placed in thermal communication with the sleeper compartment 130 to cool that area. The use of the sleeper evaporator 132 and the evaporator 114 permits the entire interior 122 of the vehicle 102 to be cooled. If desired, the sleeper compartment 130 of the vehicle is cooled while the cab compartment 128 is not, and vice versa. To provide selective cooling in this manner, a metering device (e.g., a coolant flow control valve), a thermostatic control, or other like device is employed to route refrigerant. Therefore, refrigerant is equally or disproportionately delivered to one or both of the evaporator 114 and sleeper evaporator 132.

In some situations, the sleeper compartment 130 is the only compartment that is cooled. For this to occur, the sleeper compartment 130 is usually blocked off from the cab compartment 128 by, for example, a door or curtain. Thereafter, all or a larger portion of the refrigerant is routed to the sleeper evaporator 132 compared to that amount of refrigerant routed to the evaporator 114. In addition, only the electric air mover 134 is operated while the electric air mover 120 remains idle. The need to cool only the sleeper compartment 130 in this manner arises when, for example, the engine of the vehicle 102 is not operating and the driver of the vehicle is sleeping in the sleeper compartment at night. As a result of selectively cooling only a portion of the interior 122, in this case the sleeper compartment 130, the source of electric power is not unnecessarily drained for the benefit of unoccupied areas.

In one embodiment, the primary air conditioning loop 104 further includes a receiver/dryer 136 (collectively, "dryer"). The dryer 136 contains a desiccant, which is a chemical that attracts moisture. The desiccant inhibits corrosive acids from forming in case a small amount of water and the refrigerant happen to combine. If need be, the dryer 135 also serves as temporary holding tank for liquid refrigerant.

In one embodiment, the primary air conditioning loop 104 further includes an accumulator 138. Although the accumulator 138 and the dryer 136 generally serve similar purposes, the dryer 136 is typically connected to an outlet of the condenser 110. In contrast, the accumulator 138 is attached to an outlet of the evaporator 114 and prevents liquid refrigerant from being drawn into the compressor (e.g., compressors 106, 108).

Still referring to FIG. 7, the electrically-driven compressor 106 is shown thermally coupled to the primary air conditioning loop 104. In fact, the electrically-driven compressor 106 is arranged in parallel with the belt-driven compressor 108. Valves 140, 142 are disposed in the high pressure refrigerant lines 116 upstream of each of the compressors 106, 108. These valves 140, 142 are, in one embodiment, solenoid valves.

The valves 140, 142 selectively permit or restrict a flow of refrigerant to each of the compressors 106, 108. For example, when the engine of the vehicle 102 is operating, valve 140 is open and the valve 142 is closed such that the refrigerant is routed to the belt-driven compressor 108. In this situation, the electrically-driven compressor 106 is idle. In contrast, when the engine of the vehicle 102 is not operating, valve 142 is open and valve 140 is closed such that the refrigerant is routed to the electrically-driven compressor 106. In this situation, the belt-driven compressor 108 is idle. In each instance, the refrigerant flowing through the primary air conditioning loop 104 is compressed by one of the compressors 106, 108 such that cooling of the interior 122 of the vehicle 102 is able to take place.

Because the belt-driven air mover 118 only operates when the engine does, the electric air mover 144 is employed to circulate air any time the electrically-driven compressor 108 is being relied upon. The electric air mover 144 substitutes for the belt-driven air mover 118 to circulate air over the condenser 110 during no-idle operation.

When the engine of the vehicle 102 is not operating, the electrically-driven compressor 106 shares numerous air conditioning components with the primary air conditioning loop 104 such as, for example, the condenser 110, the evaporator 114, the expansion valve 112, the dryer 136, and the like. Therefore, the no-idle system cooling the interior 122 of the vehicle 102 need not require duplicate air conditioning components that are already readily available via the primary air conditioning loop 104. Because additional components are not needed, the overall air conditioning system in the vehicle is less expensive, less prone to mechanical failures, and the like.

In one embodiment, the electrically-driven compressor 106 is operably coupled to a controller 146. The controller 146, like controller 30 illustrated in FIG. 1, is able to control the speed of the electrically-driven compressor 106. In one embodiment, the control is based on a power capacity of a source of power coupled to that compressor. As previously noted, the various sources of electrical power input into the controller 146 are from, for example, an auxiliary power unit, shore power, a vehicle electric power system, and batteries. In other embodiments, the control is based on the cooling needs.

Figure 8:
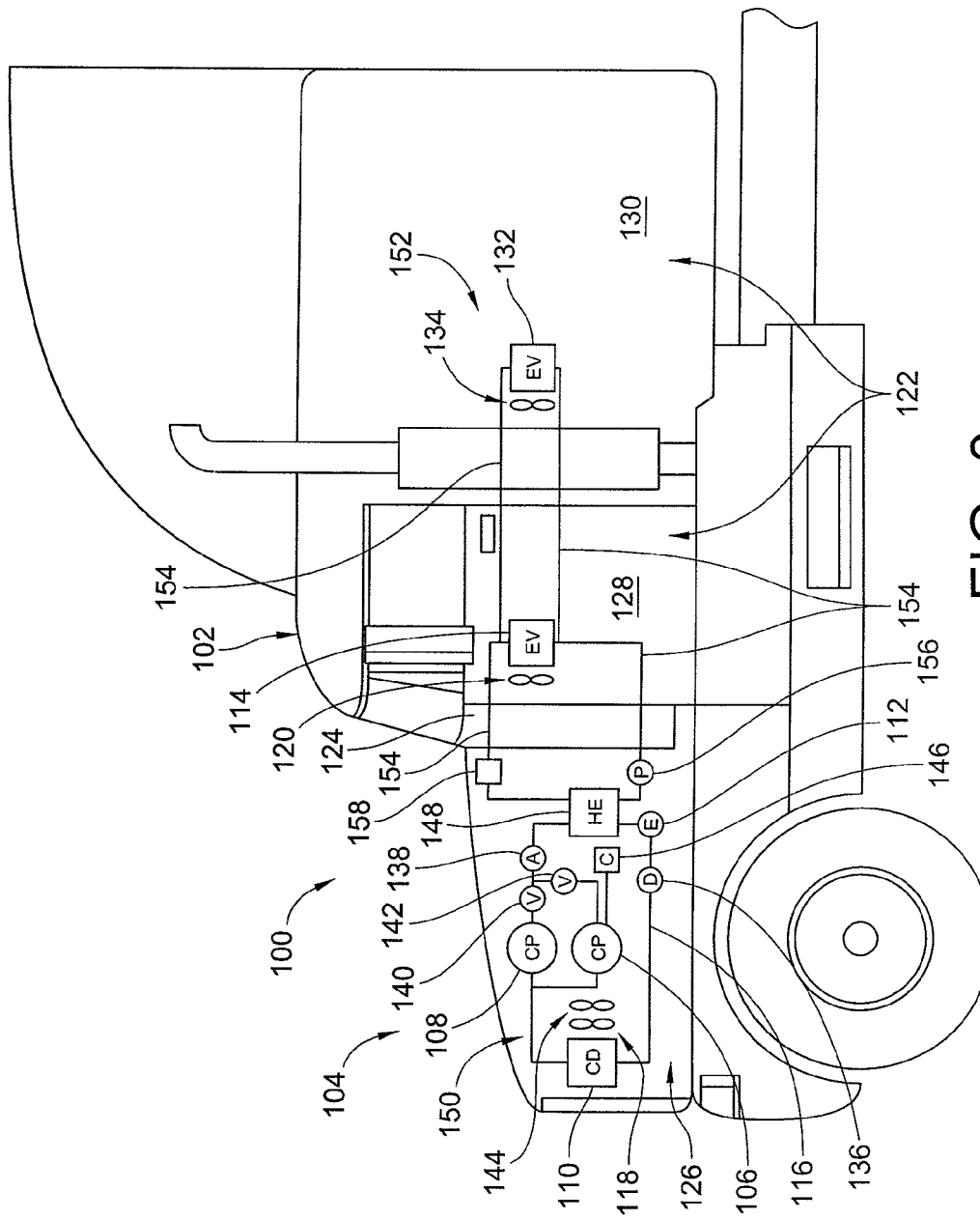
FIG. 8 is a simplified schematic diagram illustrating a heat exchanger separating the primary loop of FIG. 7 into a high pressure coolant loop and a low pressure coolant loop in the over-the-road vehicle.

Referring now to FIG. 8, in one embodiment a heat exchanger 148 is used to separate the primary air conditioning loop 104 of FIG. 7 into a high pressure coolant loop 150 and a low pressure coolant loop 152. As noted above with regard to FIG. 2, this eliminates the need to use high-pressure fittings when passing the high pressure lines 116 through the firewall 124. Therefore, low pressure coolant lines 154, which are more reliable and less susceptible to leaks, thermally couple components in the low pressure coolant loop 152.

As shown, in one embodiment the low pressure coolant loop 152 includes a coolant pump 156. The coolant pump 156 is utilized to circulate the coolant under low pressure conditions. The coolant pump 156 is used because the low pressure coolant loop 152 is without a compressor to pressurize and move the refrigerant. In one embodiment, the low pressure coolant loop 152 also includes a coolant heater 158 to warm the coolant. This is particularly beneficial when the vehicle 102 is located in cold environments.

Figure 9:
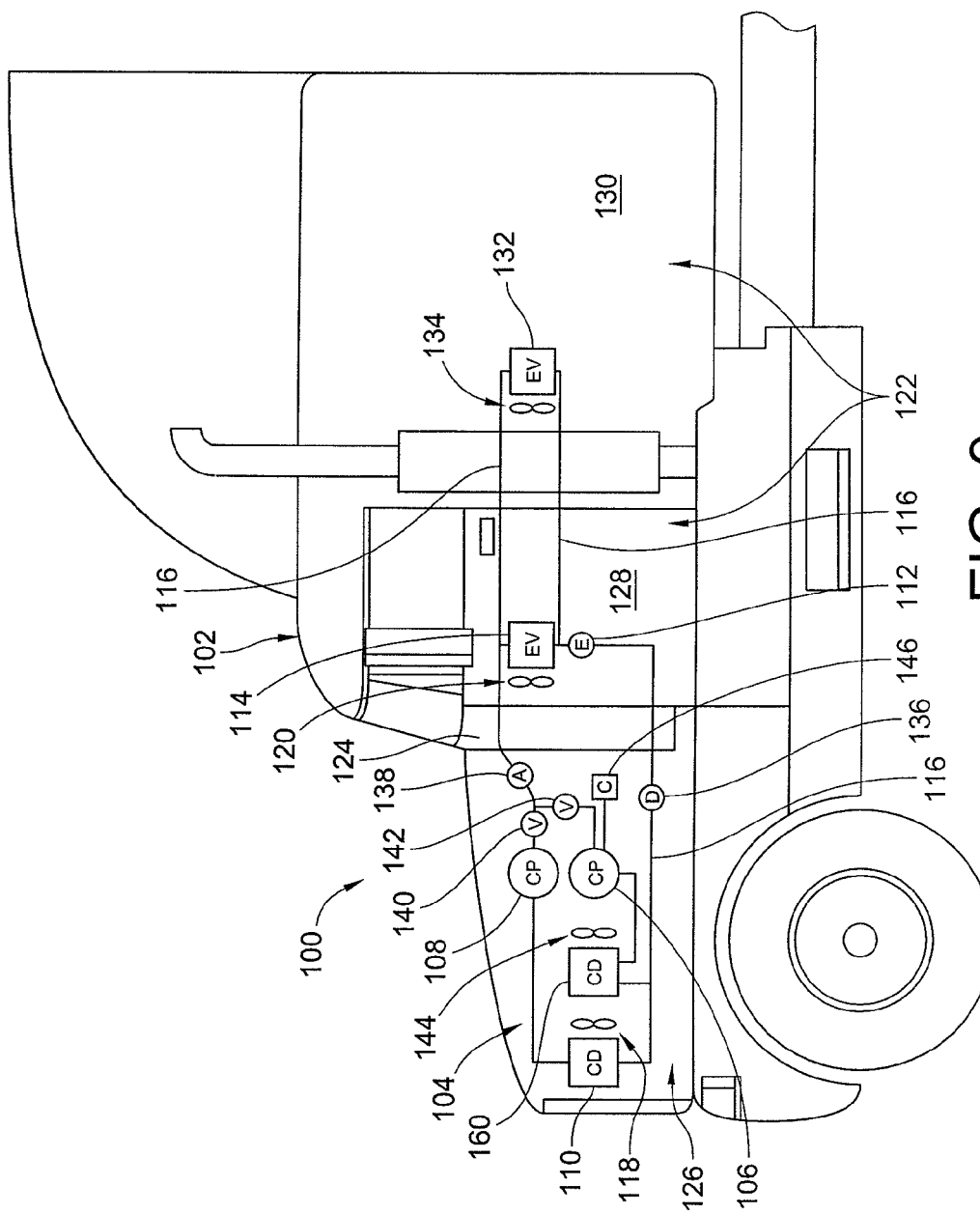
FIG. 9 is a simplified schematic diagram illustrating an electrically-driven compressor and a no-idle condenser thermally coupled to a primary coolant loop in the over-the-road vehicle.

As depicted in FIG. 9, in one embodiment the primary air conditioning loop 104 includes both an electrically-driven compressor 106 and a no-idle condenser 160. The no-idle condenser 160 has the same basic function as the condenser 110, yet the no idle condenser is operable when the engine of the vehicle 102 is not operating. In other words, when the engine of the vehicle 102 is not running, the no-idle condenser 160 is relied upon.

The electrically-driven compressor 106 and the no-idle condenser 160 share numerous air conditioning components with the primary air conditioning loop 104 such as, for example, the evaporator 114, the expansion valve 112, the dryer 136, and the like. Once again, the no-idle system cooling the interior 122 of the vehicle 102 need not contain or use duplicate air conditioning components because such components are already readily available within the primary air conditioning loop 104.

In one embodiment, the electrically-driven compressor 106 and the no-idle condenser 160 are thermally coupled in series with each other and in parallel with a combination of the belt-driven compressor 108 and the condenser 110 which are also thermally coupled in series with each other. As such, the valves 140, 142 selectively permit or restrict a flow of refrigerant to the compressor 108 and the condensers 110 and the compressor 106 and the condenser 160. For example, when the engine of the vehicle 102 is operating, valve 140 is open and the valve 142 is closed such that the refrigerant is routed to the belt-driven compressor 108 and the condenser 110. In this situation, the electrically-driven compressor 106 and the condenser 160 are idle. In contrast, when the engine of the vehicle 102 is not operating, valve 142 is open and valve 140 is closed such that the refrigerant is routed to the electrically-driven compressor 106 and the condenser 160. In this situation, the belt-driven compressor 108 and the condenser 110 are idle. In each instance, the refrigerant flowing through the primary air conditioning loop 104 is compressed by one of the compressors 106, 108 such that cooling of the interior 122 of the vehicle 102 is able to take place.

Figure 10:
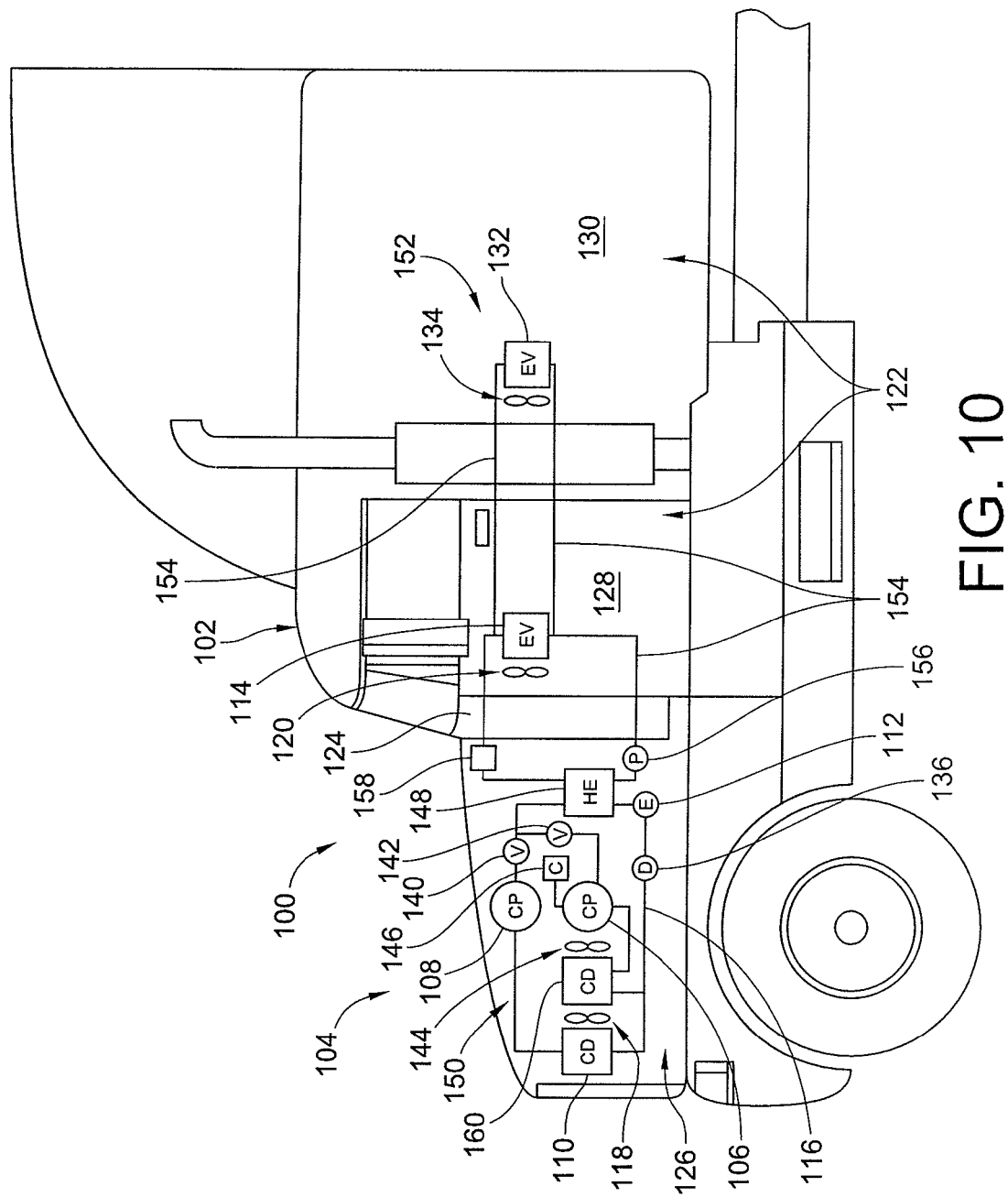
FIG. 10 is a simplified schematic diagram illustrating a heat exchanger separating the primary loop of FIG. 9 into a high pressure coolant loop and a low pressure coolant loop in the over-the-road vehicle.

Referring now to FIG. 10, in one embodiment a heat exchanger 148 is used to separate the primary air conditioning loop 104 of FIG. 9 into a high pressure coolant loop 150 and a low pressure coolant loop 152. Again, this eliminates the need to use high-pressure fittings when passing the high pressure lines 116 through the firewall 124. Therefore, low pressure coolant lines 154 are employed to thermally couple components in the low pressure coolant loop 152.

Figure 11:
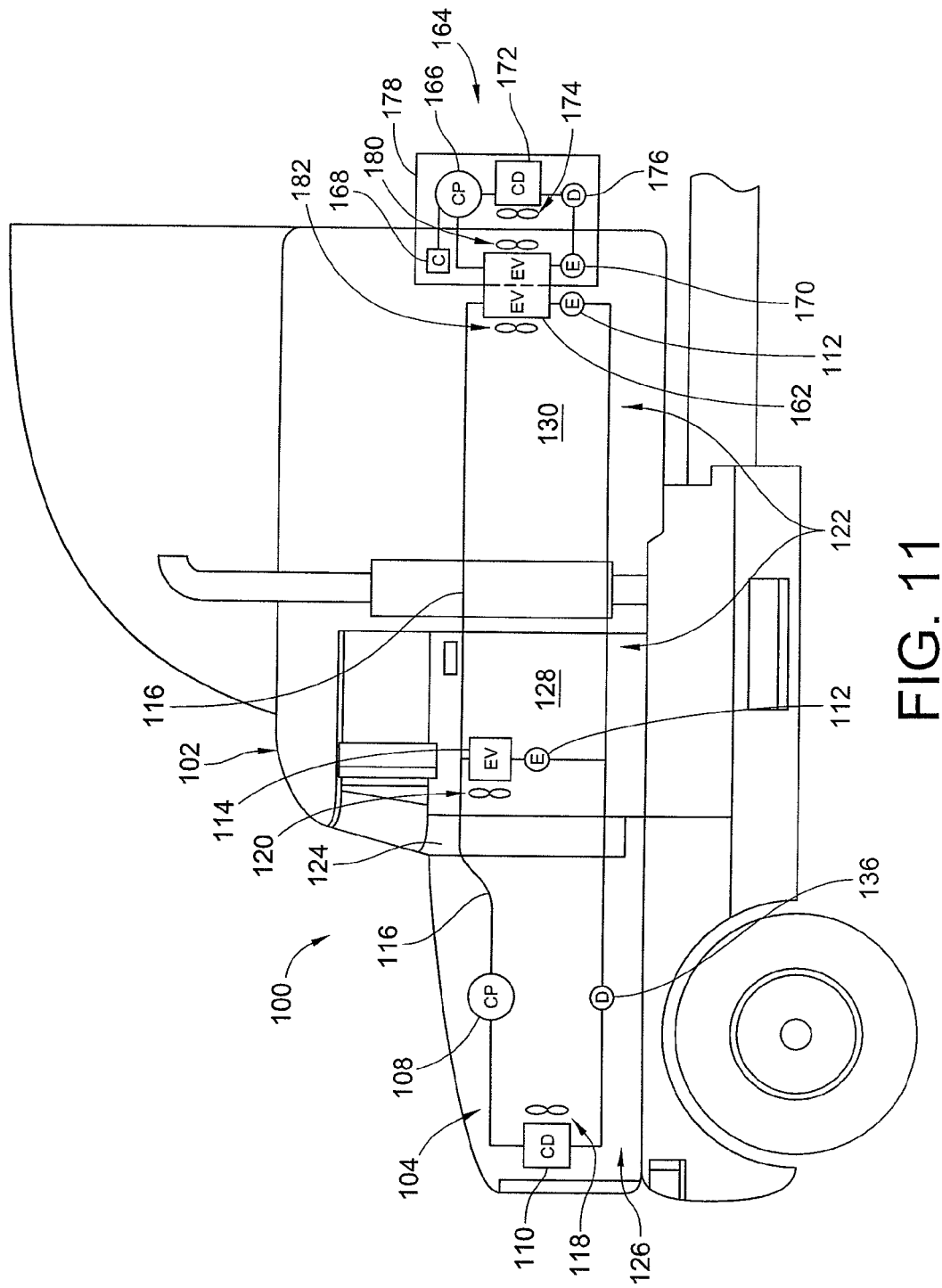
FIG. 11 is a simplified schematic diagram illustrating primary and secondary air conditioning loops of the over-the-road vehicle sharing an evaporator.

Moving to FIG. 11, in one embodiment the primary air conditioning loop 104 shares a multi-circuited evaporator 162 with a secondary air conditioning loop 164. In such an embodiment, the secondary air conditioning loop 164 is quite similar to the system 10, which is illustrated in FIG. 1, in that it the secondary air conditioning loop includes an electrically-driven compressor 166, a controller 168, an expansion valve 170, a no-idle condenser 172, an electrically-driven fan 174 disposed adjacent the no-idle condenser, and a dryer 176. However, the secondary air conditioning loop 164 also includes the multi-circuited evaporator 162 which is not found within the system 10 of FIG. 1. In one embodiment, the evaporator 162 is a dual-circuited multi-refrigerant evaporator.

As depicted in FIG. 11, the secondary air conditioning loop 164 and a portion of the multi-circuited evaporator 162 are disposed in a hermitically sealed housing 178. The other portion of the evaporator 162 projects out of the housing 178, is in thermal communication with the interior 122, and is able to be coupled to the existing refrigerant lines found in the vehicle. Therefore, the modular secondary air conditioning loop 164 is easily and conveniently attached to or disposed within the vehicle 102 (e.g., in a side compartment of the vehicle 102, in the battery compartment, and the like).

In one embodiment, an electrically-driven air mover 180 is located within the housing 178 to move air over the evaporator 162 while another electrically-driven air mover 182 is disposed outside the housing to do the same. Therefore, air is circulated across at least some portion of the evaporator 162 when the engine of the vehicle 102 is operating and when it is not operating to condition the air within the interior 122 of the cab compartment 128 and/or the sleeper compartment 130.

Installation of the secondary air conditioning loop 164 into an existing vehicle 102 (or retrofitting the loop into the vehicle) is performed quite simply by removing the typical single-circuit sleeper evaporator from the sleeper compartment 130 of the vehicle, discarding it, and then coupling the existing refrigerant lines (e.g., refrigerant lines 116) to the circuit of the dual-circuited evaporator 162. Because of the ease of installation, a no-idle air conditioning system is quickly and easily installed in the vehicle 102 without the components and structure of the vehicle needing substantial alteration or modification.

As shown in FIG. 11, the multi-circuited evaporator 166 is in thermal communication with the sleeper compartment 130. Even so, the multi-circuited evaporator 166 is, in another embodiment, in thermal communication with the cab compartment 128 or the whole of the interior 122 of the vehicle 102.

Figure 12:
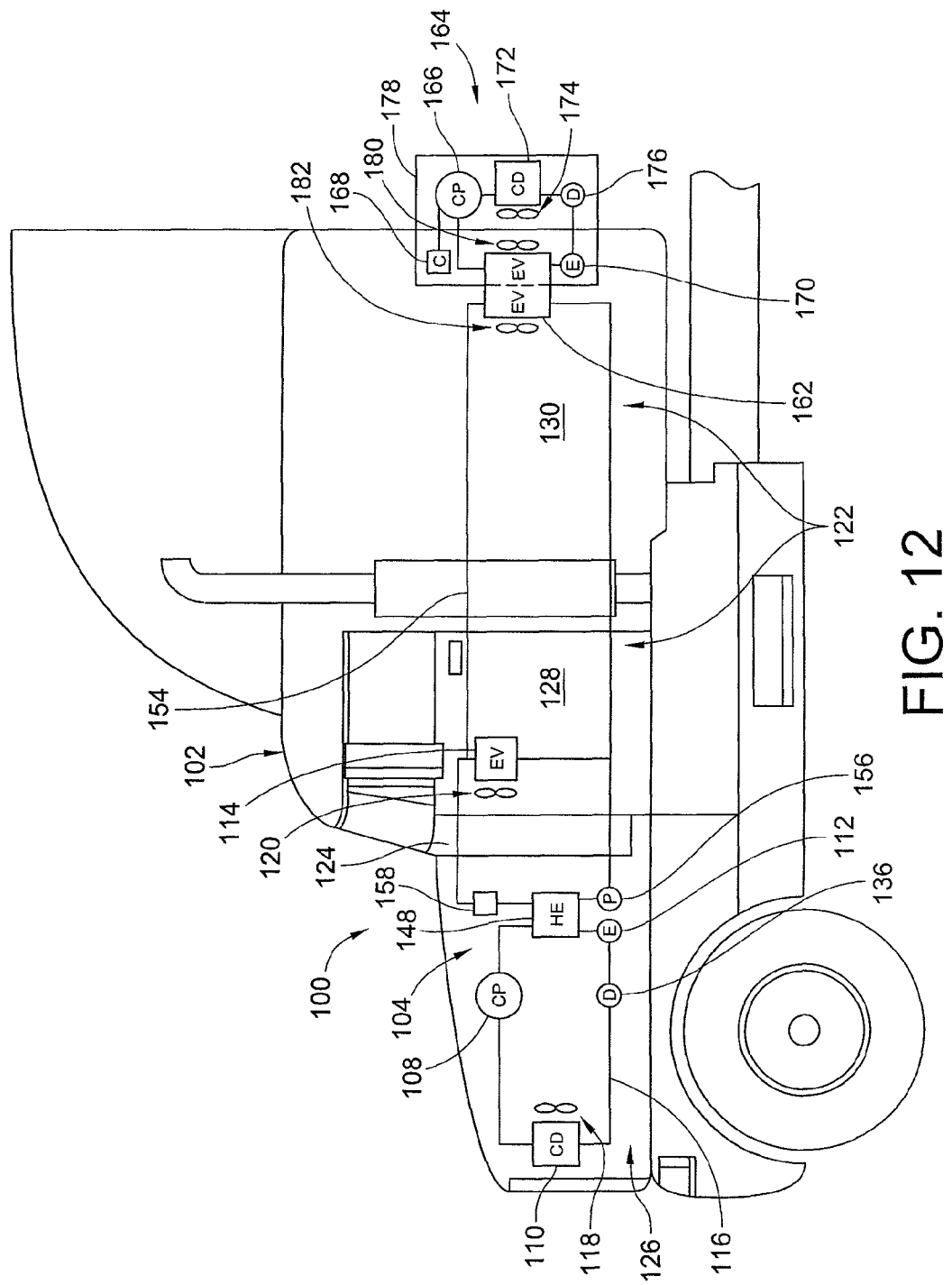
FIG. 12 is a simplified schematic diagram illustrating a heat exchanger separating the primary loop of FIG. 11 into a high pressure coolant loop and a low pressure coolant loop in the over-the-road vehicle.

Referring now to FIG. 12, in one embodiment a heat exchanger 148 is used to separate the primary air conditioning loop 104 of FIG. 11 into a high pressure coolant loop 150 and a low pressure coolant loop 152. Again, this eliminates the need to use high-pressure fittings when passing the high pressure lines 116 through the firewall 124. Therefore, low pressure coolant lines 154 are employed to thermally couple components in the low pressure coolant loop 152. As depicted in FIG. 12, due to the use of the heat exchanger 148, the multi-circuit evaporator 162 is coupled to the low pressure coolant lines 154 in lieu of the high pressure coolant lines 116 as shown in FIG. 11.

In one embodiment, the compressor 166 in the secondary air conditioning loop 164 (FIGS. 11 and 12) or the compressor 106 thermally coupled to the primary air conditioning loop 104 (FIGS. 7-10) is an alternating-current (AC) compressor driven by a frequency drive. As such, when the frequency input into the compressor is varied the speed or output of the compressor is correspondingly varied. This saves or conserves the power of the electrical source as noted above.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air conditioning system for use in a vehicle having an engine, comprising:
   a primary air conditioning loop including a belt-driven compressor, the belt-driven compressor operable when the engine of the vehicle is operating;
   an electrically-driven compressor thermally coupled to the primary air conditioning loop, the electrically-driven compressor operable when the engine of the vehicle is not operating; and
   wherein the primary air conditioning loop is separated into a high pressure coolant loop and a low pressure coolant loop by a heat exchanger.

2. The air conditioning system of claim 1, wherein the low pressure coolant loop includes a pump and at least one evaporator, the at least one evaporator in thermal communication with an interior of the vehicle.

3. The air conditioning system of claim 2, wherein the low pressure coolant loop includes a coolant heater.

4. An air conditioning system for use in a vehicle having an engine, comprising:
   a primary air conditioning loop including a belt-driven compressor, the belt-driven compressor operable when the engine of the vehicle is operating;
   an electrically-driven compressor thermally coupled to the primary air conditioning loop, the electrically-driven compressor operable when the engine of the vehicle is not operating;
   a no-idle condenser thermally coupled to the electrically-driven compressor and the primary air conditioning loop, the no-idle condenser operable when the engine of the vehicle is not operating; and
   wherein the primary air conditioning loop is divided into a high pressure coolant loop and a low pressure coolant loop by a heat exchanger, the low pressure coolant loop including an evaporator in thermal communication with an interior portion of the vehicle, a coolant pump, and a coolant heater.

* * * * *